US008566631B2

(12) United States Patent
 Noda (10) Patent No.: US 8,566,631 B2
(45) Date of Patent: Oct. 22, 2013

(54) SERIALLY SHUTTING DOWN EXTENSION UNITS TO TIME EXTEND POWER TO CPU FROM CHARGING BACKUP SUPPLY

(75) Inventor: Hideki Noda, Daito (JP)

(73) Assignee: Panasonic Electric Works Sunx Co., Ltd, Aichi (JP)

( * ) Notice: Subject to any disclaimer, the term of this patent is extended or adjusted under 35 U.S.C. 154(b) by 442 days.

(21) Appl. No.: 12/923,496

(22) Filed: Sep. 24, 2010

(65) Prior Publication Data

US 2011/0078481 A1    Mar. 31, 2011

(30) Foreign Application Priority Data

Sep. 25, 2009 (JP) ................... 2009-221501
Sep. 25, 2009 (JP) ................... 2009-221502
Sep. 25, 2009 (JP) ................... 2009-221600

(51) Int. Cl.
*G06F 1/30* (2006.01)
(52) U.S. Cl.
USPC .......................................... 713/340; 713/330
(58) Field of Classification Search
None
See application file for complete search history.

(56) References Cited

U.S. PATENT DOCUMENTS

| 5,835,780 | A | 11/1998 | Osaki et al. |
| 7,505,035 | B2 * | 3/2009 | Nitawaki ...................... 345/211 |
| 2007/0285950 | A1 | 12/2007 | Nakamura et al. |
| 2009/0315397 | A1 | 12/2009 | Udo |

FOREIGN PATENT DOCUMENTS

| JP | S58-068109 | 4/1983 |
| JP | H06-324721 | 11/1994 |
| JP | H08-241151 | 9/1996 |
| JP | H10-224200 | 8/1998 |
| JP | 2000-105521 | 4/2000 |
| JP | 2000-506660 | 5/2000 |
| JP | 2001-184142 | 7/2001 |
| JP | 2002-196022 | 7/2002 |
| JP | 2005-157665 | 6/2005 |
| JP | 2006-079361 | 3/2006 |
| JP | 2007-310693 | 11/2007 |
| JP | 2008-206223 | 9/2008 |
| JP | 2009-147997 | 7/2009 |

* cited by examiner

*Primary Examiner* — Kenneth Kim
(74) *Attorney, Agent, or Firm* — Bacon & Thomas, PLLC (57) ABSTRACT

A programmable controller includes one or more extension units; a CPU unit for controlling the extension units; and a charging element. The CPU unit includes a voltage detection circuit for detecting an output voltage of the charging element and outputting a voltage reduction signal when the detected output voltage is lowered to a level equal to or lower than a reference value and a signal output circuit for outputting a power supply stop signal in response to the voltage reduction signal. Each extension unit includes a voltage detection circuit for detecting an output voltage of an power circuit and outputting a power supply stop signal when the detected output voltage is lowered to a level equal to or lower than a reference value and a power supply stop circuit for stopping the power circuit in response to the power supply stop signal.

2 Claims, 7 Drawing Sheets

SERIALLY SHUTTING DOWN EXTENSION UNITS TO TIME EXTEND POWER TO CPU FROM CHARGING BACKUP SUPPLY

FIELD OF THE INVENTION

The present invention relates to a programmable controller.

BACKGROUND OF THE INVENTION

Conventionally, there has been provided a programmable controller (PLC) in which an extended I/O unit can be attached (see, e.g., Patent Document 1).

Figure 7A:
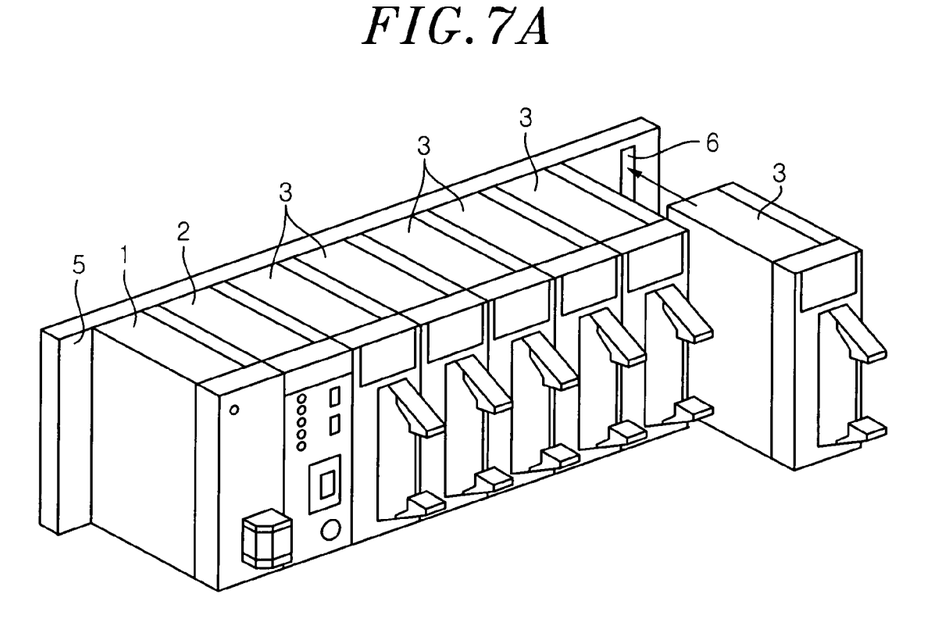
FIGS. 7A and 7B show exploded perspective views of conventional programmable controllers.

FIG. 7A illustrates an example of a building block type programmable controller including a power unit 1, a CPU unit 2 and a plurality of (six in the example of FIG. 7A) I/O units 3 which are mounted on a backplane 5. In the programmable controller, a system power generated from the power unit 1 is supplied to the CPU unit 2 and each of the I/O units 3 via an internal bus provided in the backplane 5.

Figure 7B:
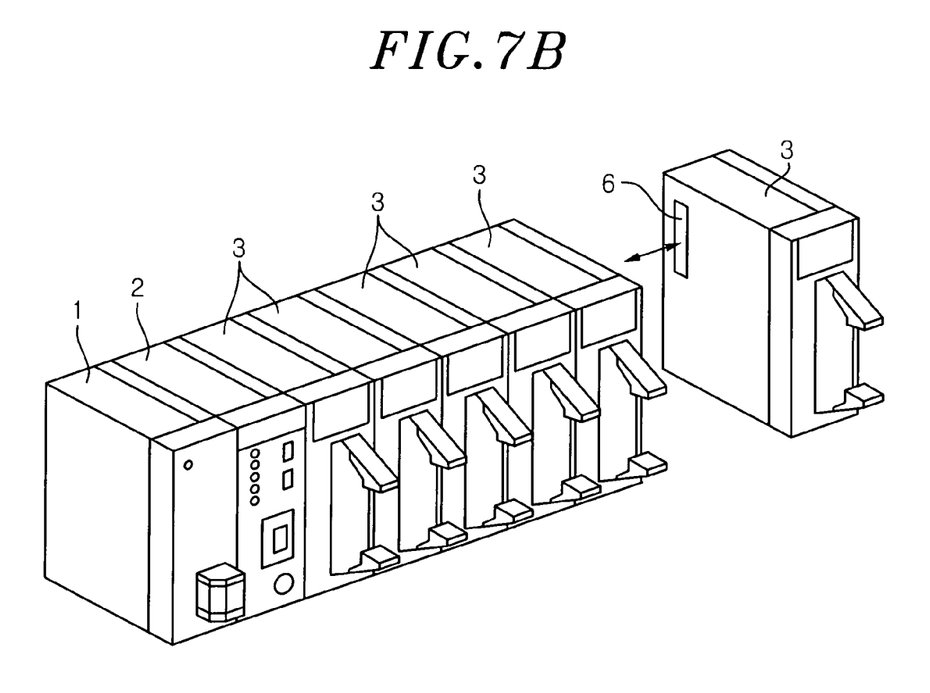

Further, FIG. 7B illustrates an example of a stack type programmable controller, which includes a power unit 1, a CPU unit 2 and a plurality of (six in the example of FIG. 7B) I/O units 3. Since the stack type programmable controller does not include the backplane 5 unlike the building block type programmable controller, the units are fixed by connecting one unit to a next unit. A system power generated from the power unit 1 is supplied to the CPU unit 2 and each of the I/O units 3 via stack connectors 6.

[Patent Document 1] Japanese Patent Application Publication No. 2006-79361 (Paragraphs [0014]-[0016] and FIG. 2)-09P00835

[Patent Document 2] Japanese Patent Application Publication No. 2009-147997 (Paragraphs [0016]-[0023] and FIG. 1)-09P00833

[Patent Document 3] Japanese Patent Application Publication No. 2000-105521 (Paragraphs [0057]-[0060] and FIGS. 10 and 11)-09P00834

Each of the above-described conventional programmable controllers includes a back-up power source to perform a termination process (e.g., data back-up or the like) even when a power supply is shut down due to a sudden power failure or the like. However, a back-up time provided from the back-up power source depends on the capacitance of a capacitor thereof and, for example, when a system becomes complicated and processes a large amount of data, the back-up power source may be turned off before completing the termination process.

Further, in the programmable controller shown in FIGS. 7A and 7B, the system power generated from the power unit 1 is simultaneously supplied to the CPU unit 2 and each of the I/O units 3 and the capacity of the power unit 1 may be large enough to satisfy normal consumption power depending on the number of the connected I/O units 3 and specifications thereof. In the start-up, however, the consumption power may exceed the capacity of the power unit 1 and it may be impossible to normally start the system.

In order to solve the above problem, there is proposed a programmable controller in which the I/O units are started sequentially in a specific order (see, e.g., Patent Document 2). In this programmable controller, start-up circuits with different time constants from each other are respectively provided in the I/O units and each I/O unit starts its own power circuit at a start-up timing corresponding to its own time constant.

The programmable controller disclosed in Patent Document 2 is configured such that the respective power circuits of the I/O units have different start-up timings in order to prevent the consumption power in the start-up from exceeding the capacity of the power unit. Accordingly, the system can be normally started. However, the start-up time of each I/O unit depends on a load, circuit configuration and the like and it is difficult to set an optimal start-up time while taking them into account.

Meanwhile, when electric power is supplied to the programmable controller shown in FIGS. 7A and 7B and all I/O units 3 are initialized, the CPU unit 2 identifies each of the I/O units 3 and starts communications with the I/O units 3 to execute a sequence program.

There is disclosed an apparatus in which communications are not started until all extension units are initialized (see, e.g., Patent Document 2). In the apparatus, extension units connected to a main unit are initialized sequentially from the one at the downstream side to the one at the upstream side, and an upstream side extension unit begins to be initialized upon detecting an initialization completion signal from a downstream side extension unit. Further, when the main unit detects an initialization completion signal from the most upstream side extension unit, it determines that all extension units have been initialized and starts communications with each of the extension units.

In the above-described apparatus, communications are not performed between the main unit and the extension units until all extension units are initialized. However, since the upstream side extension unit begins to be initialized upon detecting an initialization completion signal from the downstream side addition unit, the start-up time of an extension unit accumulatively increases. As a result, it may require some time until the system is started after all extension units have been initialized. In this case, the time until the system is started means the time until the CPU unit identifies each extension unit and starts communications with each extension unit after all extension units have been initialized.

SUMMARY OF THE INVENTION

In view of the above, the present invention provides a programmable controller capable of providing an extra time for a termination process by suppressing power consumption when a power source is turned off.

Moreover, the present invention provides a programmable controller capable of surely starting extended I/O units one by one without a separate adjustment while preventing a start-up time from being extended.

Further, the present invention provides a programmable controller capable of preventing a start-up time from being delayed.

In accordance with a first aspect of the present invention, there is provided a programmable controller including: one or more extension units; a CPU unit for controlling the extension units, the extension units being sequentially connected to the CPU unit; and a charging element for supplying electric power to the extension units and the CPU unit when supply of external electric power is cut off. In the programmable controller, the CPU unit includes: a first voltage detection circuit for detecting an output voltage of the charging element and outputting a voltage reduction signal when the detected output voltage is lowered to a level equal to or lower than a first reference value; and a signal output circuit for outputting a first power supply stop signal in response to the voltage reduction signal outputted from the first voltage detection circuit.

Further, each of the extension units includes: a power circuit for supplying an internal electric power; a second voltage detection circuit for detecting an output voltage of the power circuit and outputting a second power supply stop signal when the detected output voltage of the power circuit is lowered to a level equal to or lower than a second reference value; and a power supply stop circuit for stopping the power circuit if the power supply stop signal is inputted from the signal output circuit or the second voltage detection circuit.

By this configuration, in a case where power is supplied from the charging element due to the cut-off of an external power source, when the output voltage of the charging element is equal to or lower than a predetermined reference value, the power circuit of the extension unit is stopped. As a result, since the power consumption is suppressed, the operation time of the CPU unit can be elongated compared to a conventional case, and extra time can be provided for the termination process such as data back-up in the CPU unit.

In accordance with a second aspect of the present invention, there is provided a programmable controller including: one or more extension units; and a CPU unit for controlling the extension units, the extension units being sequentially connected to the CPU unit. In the programmable controller, each of the extension units includes a signal line component connected to form a signal line extending from the CPU unit, and a signal output circuit for outputting an initialization completion signal indicative of initialization completion of said each of the extension units to the signal line. Further, a state of the signal line is changed if the initialization completion signals are outputted from the signal output circuits of all of the extension units, and the CPU unit determines that all the extension units have been initialized by detecting a change in state of the signal line.

By this configuration, each extension unit is individually initialized when power is supplied to each extension unit. Accordingly, the start-up time of the system is determined by the longest initialization time, which is different from a conventional case in which the start-up time accumulatively increases. Therefore, it is possible to prevent the start-up time of the system from being elongated. Further, the CPU unit can be informed of the completion of the initialization of all extension units by detecting the variation in the state of the signal line.

In accordance with a third aspect of the present invention, there is provided a programmable controller including: one or more extension units; and a CPU unit for controlling the extension units, the extension units being sequentially connected to the CPU unit. In the programmable controller, the CPU unit includes a signal output circuit for outputting a first start-up completion signal when a driving voltage is supplied, and each of the extension units includes: a power circuit for supplying an internal electric power; a voltage detection circuit for detecting an output voltage of the power circuit and outputting a second start-up completion signal when the detected output voltage reaches a reference value; and a start-up trigger circuit for starting the power circuit when the start-up completion signal is inputted from the signal output circuit or the voltage detection circuit.

By this configuration, since each extension unit is started by the start-up completion signal from the neighboring unit, it is possible to surely start the extension units one by one without adjustment and prevent the start-up time from being elongated in comparison with a conventional case of setting the start-up time. Further, when plural extension units are connected to each other, the extension units are started sequentially from the side of the CPU unit without simultaneously staring the extension units. Accordingly, the consumption power in the start-up does not exceed the capacity of the external power source, so that the system can be normally started. Further, it is possible to inform each extension unit that the neighboring extension unit has been started by the start-up completion signal.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, a programmable controller in accordance with an embodiment of the present invention will be described in detail with reference to the accompanying drawings which form a part hereof. The programmable controller in accordance with the embodiment of the present invention can be used as a controller of an industrial machine. Further, a stack type programmable controller is described as an example in the following description, and FIG. 7B will be referred to because its external appearance is same as the one shown in FIG. 7B.

Figure 1:
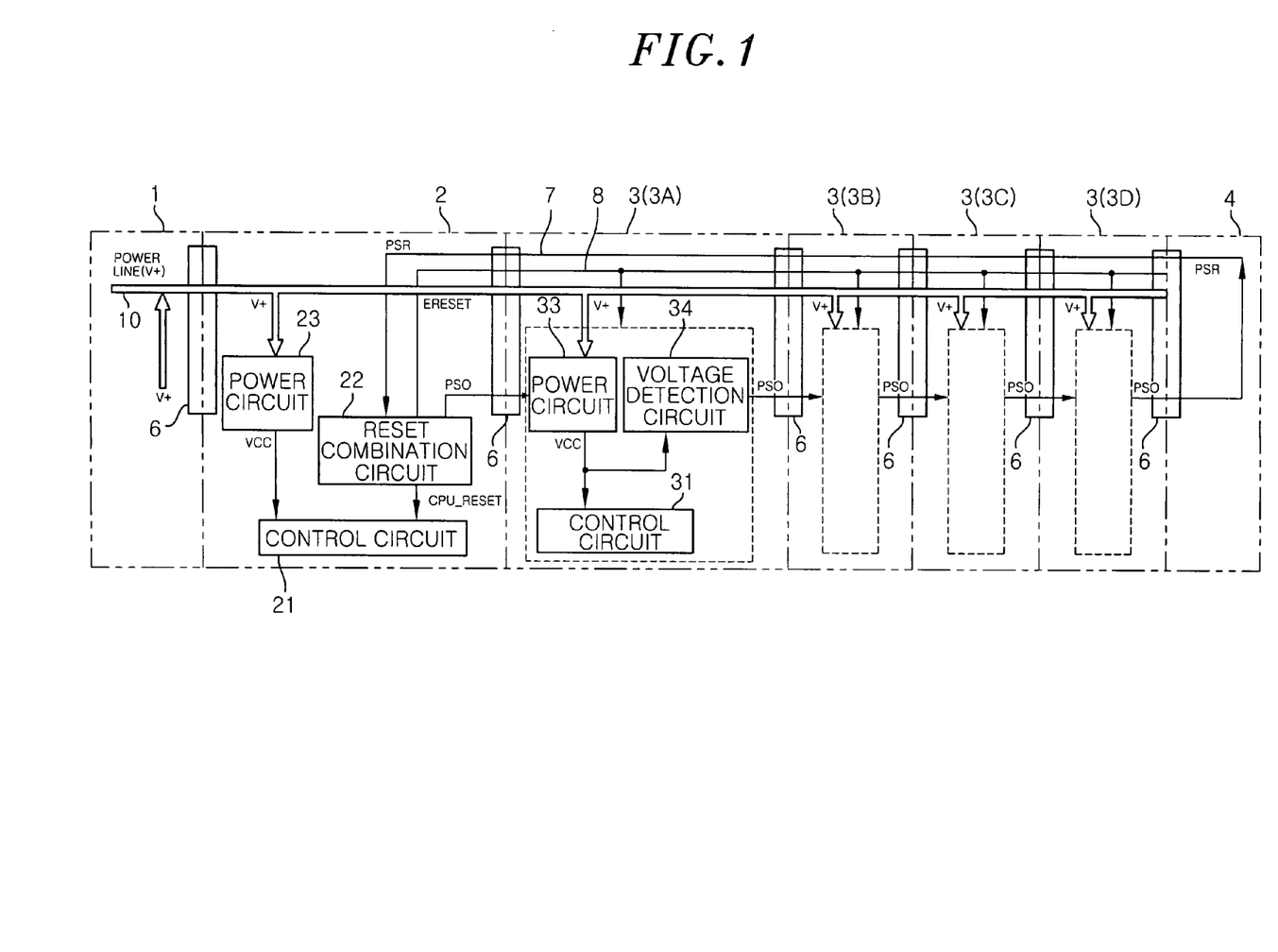
FIG. 1 is a schematic system diagram showing a programmable controller in accordance with an embodiment of the present invention.

FIG. 1 is a schematic system diagram showing a programmable controller in accordance with an embodiment of the present invention, which includes a power unit 1 for supplying an electric power to the entire system, a plurality of (four in FIG. 1) I/O units (extension units) 3 having an interface conforming to a device to be controlled, a CPU unit 2 for individually controlling each of the I/O units 3, and a terminal unit 4 connected to the I/O unit 3 at one end of the programmable controller. Further, as shown in FIG. 7B, the power unit 1, the CPU unit 2, the I/O units 3 and the terminal unit 4 (not shown in FIG. 7B) are connected sequentially from the one at the left side to the one at the right side.

Further, if it is necessary to distinguish each of the I/O units 3, reference numerals 3A, 3B, 3C and 3D will be assigned to the respective I/O units 3 sequentially from the side of the CPU unit 2. That is, in the embodiment, the I/O unit 3D is a terminal extension unit. Further, the units are electrically connected to each other via stack connectors 6 as shown in FIG. 1.

The power unit 1 converts an electric power supplied from an external power source to a voltage V+ required for the system. Then, the power unit 1 supplies the system power source V+ to each of the CPU unit 2 and the I/O units 3 via a power line 10. Further, the power unit 1 includes a capacitor (charging element) C1 (see FIG. 3) serving as a back-up power source used when the external power source is cut OFF due to, e.g., a power failure or the like. During the power failure, the capacitor C1 is discharged to supply an electric power to the CPU unit 2 and the I/O units 3. The detailed description will be given later.

Figure 3:
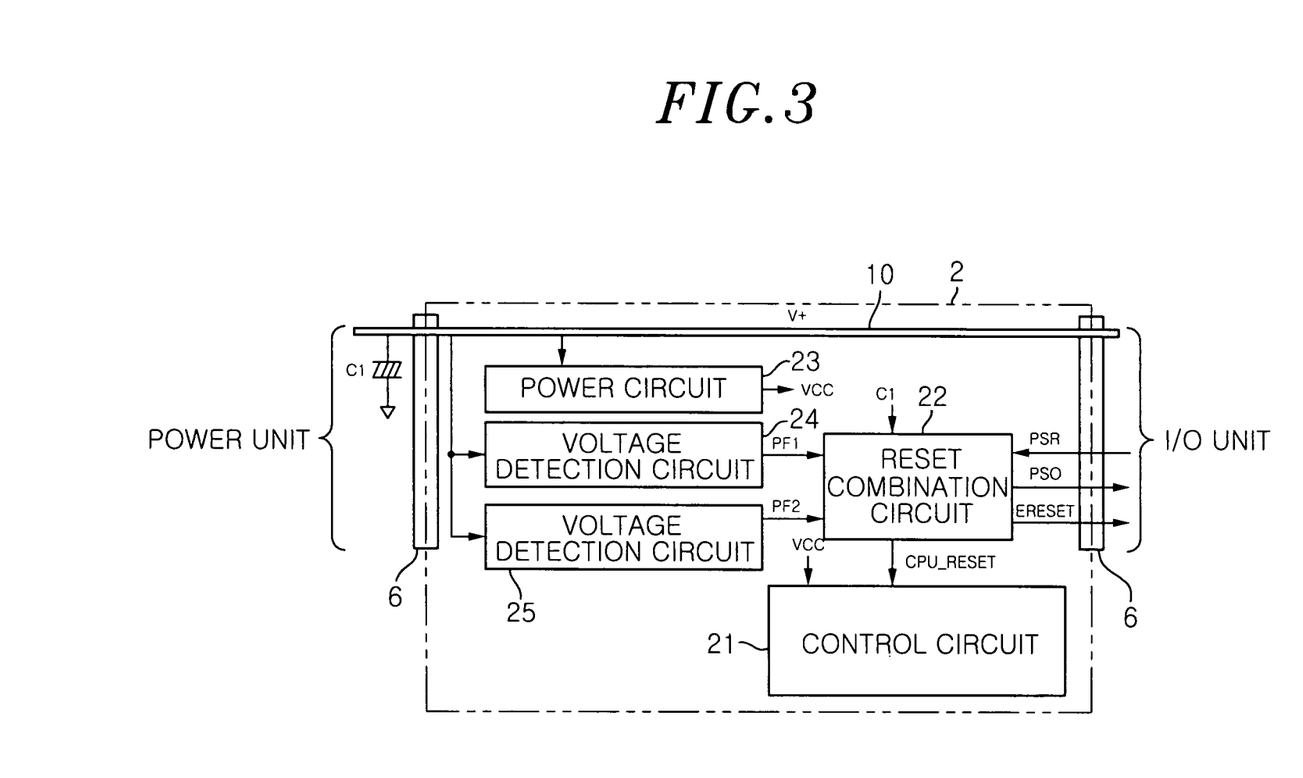
FIG. 3 is a block diagram of a CPU unit in accordance with the embodiment of the present invention.

The CPU unit 2 includes, as shown in FIGS. 1 and 3, a power circuit 23 for generating a driving power source (internal electric power) VCC from the system power source V+ supplied via the power line 10, and voltage detection circuits 24 and 25 for outputting respective specific detection signals by detecting the source voltage of the system power source V+. The CPU units 2 further includes a reset combination circuit (signal output circuit) 22 for outputting a start-up completion signal PSO when the driving power source VCC is supplied from the power circuit 23, and a control circuit 21 for executing a program of the programmable controller.

Further, when the system is started, the reset combination circuit 22 needs to be started firstly. In this embodiment, for example, a CMOS logic circuit or programmable logic device (PLD) capable of ignoring a start-up time is used as the reset combination circuit 22.

Figure 6:
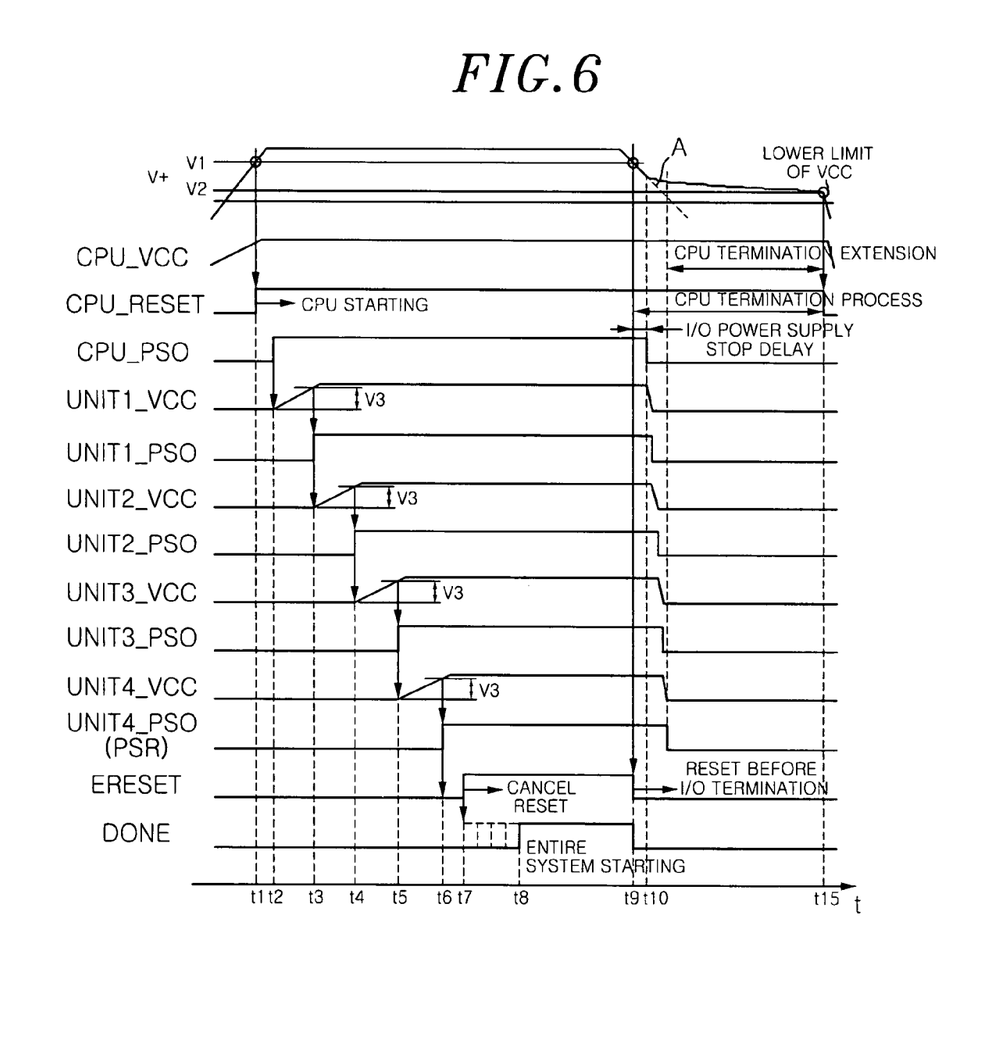
FIG. 6 depicts a timing diagram in an operation in accordance with the embodiment of the present invention.

The voltage detection circuit (first voltage detection circuit) 24 detects the source voltage of the system power source V+ and outputs a start-up signal PF1 of an H level to the reset combination circuit 22 if the detected voltage reaches a reference voltage V1 (see FIG. 6). If the H level start-up signal PF1 is inputted, the reset combination circuit 22 outputs a reset signal CPU_RESET to the control circuit 21 to start the control circuit 21.

Further, in case of, e.g., a power failure, the voltage detection circuit 24 detects the system voltage V+ supplied from the capacitor C1, and outputs a start-up signal (voltage reduction signal) PF1 of an L level to the reset combination circuit 22 if the detected voltage is not higher than the reference voltage V1. The reset combination circuit 22, if the L level start-up signal PF1 is inputted, outputs the reset signal CPU_RESET to the control circuit 21 to stop the control circuit 21. In this case, the reset signal CPU_RESET is set at an H level to start the control circuit 21, whereas the reset signal CPU_RESET is set at an L level to reset the control circuit 21.

The voltage detection circuit 25 detects the source voltage of the system power source V+ and outputs a stop signal PF2 to the reset combination circuit 22 if the detected voltage is equal to or lower than a predetermined reference voltage V2 (V2<V1, see FIG. 6). Further, the reset combination circuit 22, if the stop signal PF2 is inputted, outputs the reset signal CPU_RESET of the L level to the control circuit 21 to stop the control circuit 21.

The reset combination circuit 22 not only starts/stops the control circuit 21 as described above, but also outputs the start-up completion signal PSO to the neighboring I/O unit 3A when the driving voltage VCC is supplied. Further, if the start-up completion signal PSO from the I/O unit 3D via the terminal unit 4 (entire unit start-up completion signal PSR) is inputted to the reset combination circuit 22 via the signal line 7, the reset combination circuit 22 determines that all of the I/O units 3 are started up, and outputs a reset signal ERESET to each I/O unit 3 via a signal line 8 to cancel a reset state of each I/O unit 3.

In this case, the reset signal ERESET is set at an H level to start each I/O unit 3, while the reset signal ERESET is set at an L level to reset each I/O unit 3. Further, the start-up completion signal PSO is set at an H level to start a power circuit 33 described later, while the start-up completion signal PSO is set at an L level to stop the power circuit 33. That is, in this embodiment, the L level start-up completion signal PSO becomes a power supply stop signal.

Figure 2A:
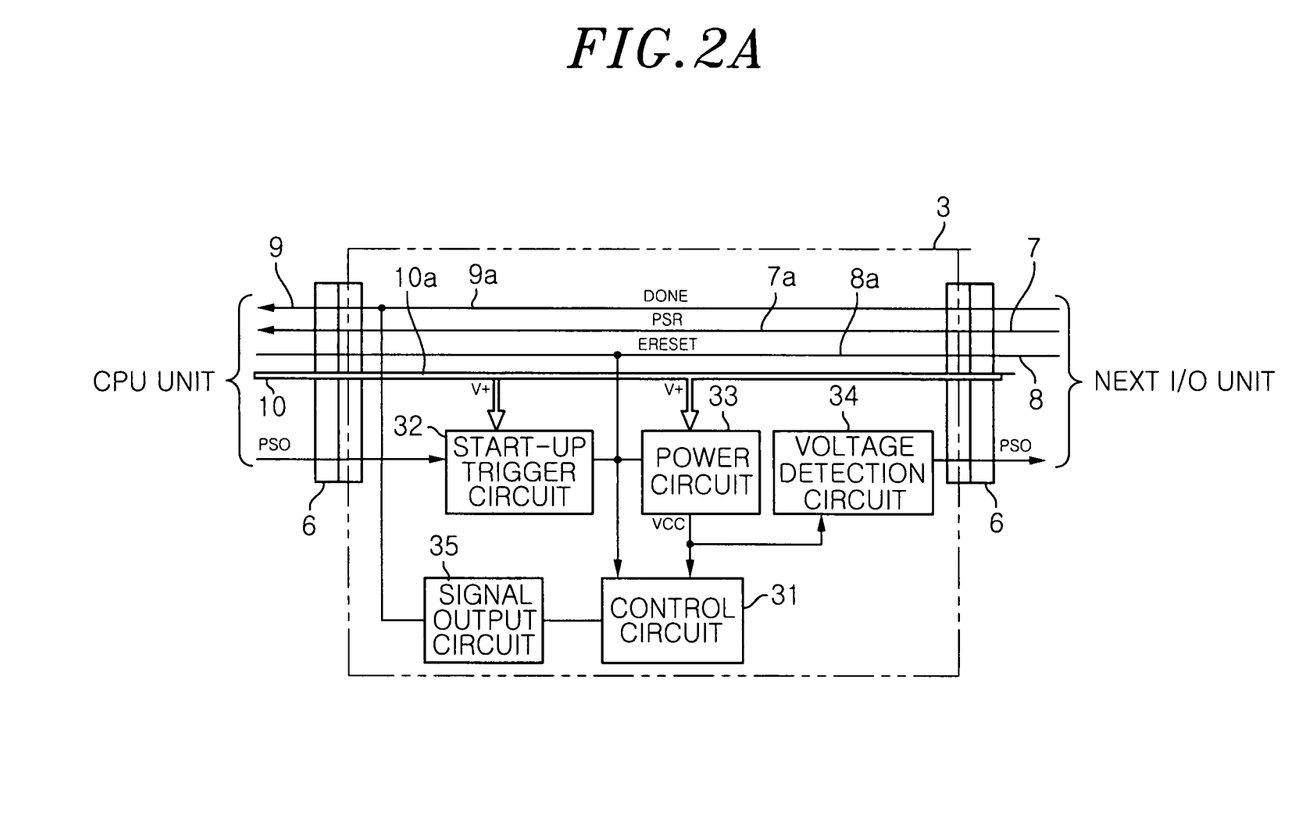
FIG. 2A is a block diagram of an I/O unit in accordance with the embodiment of the present invention.

The I/O unit 3 includes, as shown in FIGS. 1 and 2A, the power circuit 33 for generating a driving power source (internal electric power) VCC from the system power source V+ supplied via the power line 10, and a voltage detection circuit (second voltage detection circuit) 34 for detecting an output voltage of the power circuit 33 and outputting the start-up completion signal PSO when the output voltage reaches a predetermined reference voltage V3 (see FIG. 6). Further, the I/O unit 3 includes a start-up trigger circuit (power supply stop circuit) for starting the power circuit 33 when the start-up completion signal PSO is inputted from the reset combination circuit 22 or the voltage detection circuit 34, a control circuit 31 for executing a program of the I/O unit, and a signal output circuit 35 for outputting an initialization completion signal indicative of the completion of the initialization of the control circuit 31.

Figure 2B:
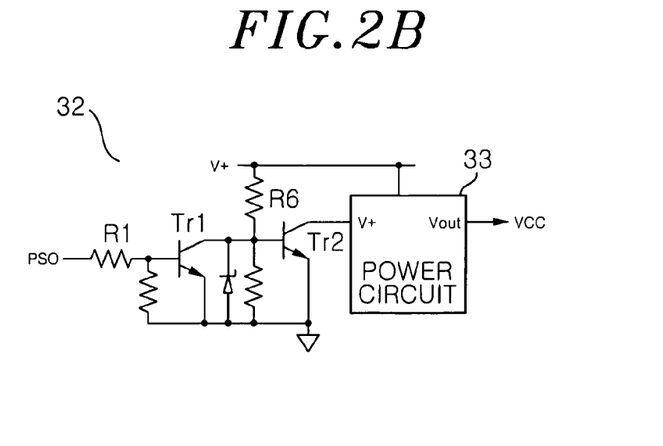
FIGS. 2B to 2D are circuit diagrams of circuits forming the I/O unit.

FIG. 2B shows a circuit diagram of the start-up trigger circuit 32. The start-up trigger circuit 32 includes two transistors Tr1 and Tr2. A base of the transistor Tr1 is connected via a resistor R1 to an output of the voltage detection circuit 34 of the neighboring I/O unit 3 or the reset combination circuit 22 of the CPU unit 2. The transistor Tr1 is turned ON to cause conduction between a collector and an emitter thereof when the start-up completion signal PSO of the H level is inputted to the base thereof.

Further, the collector of the transistor Tr1 is connected to a base of the transistor Tr2 and also connected to the system power source V+ via a resistor R6. When the transistor Tr1 is turned ON, that is, if conduction is made between the collector and the emitter of the transistor Tr1, the transistor Tr2 is turned OFF. Accordingly, the power circuit (power IC) 33 is started to supply the driving power source VCC to internal circuits.

Figure 2C:
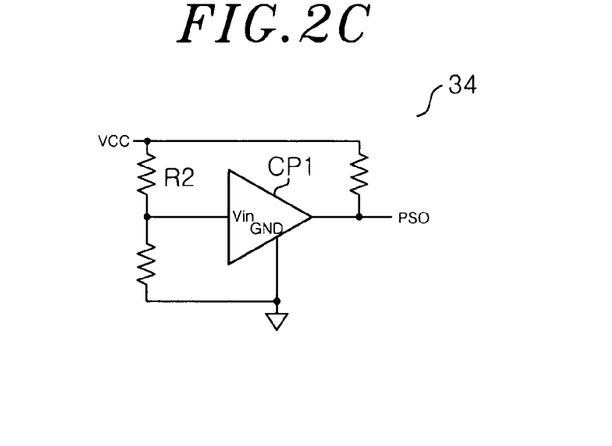

FIG. 2C is a circuit diagram of the voltage detection circuit 34, which includes a comparator CP1. The driving power source VCC outputted from the power circuit 33 is inputted to an input terminal Vin of the comparator CP1 via a resistor R2. The comparator CP1 compares a source voltage of the driving power source VCC with a predetermined reference voltage V3 and, if the driving power source VCC is higher than the reference voltage V3, outputs the start-up completion signal PSO via an output terminal.

Figure 2D:
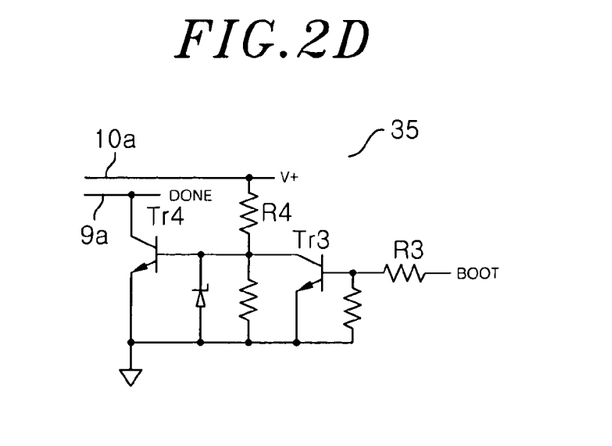

FIG. 2D is a circuit diagram of the signal output circuit 35, which includes transistors Tr3 and Tr4. A base of the transistor Tr3 is connected to an output terminal of the control circuit 31 via a resistor R3. Thus, when a BOOT signal of an H level (a signal indicative of the initialization completion) is inputted to the base of the transistor Tr3 from the control circuit 31, the transistor Tr3 is turned ON to cause conduction between a collector and an emitter thereof. Further, the collector of the transistor Tr3 is connected to a base of the transistor Tr4 and also connected to the power line component 10a connected to form a power line 10 via a resistor R4.

Meanwhile, a collector of the transistor Tr4 is connected to a signal line component 9a connected to form a signal line 9 for transmitting an entire unit initialization completion signal DONE indicative of the initialization completion of all I/O units 3. In the signal output circuit 35, if the system power source V+ is supplied, the transistor Tr4 is turned ON. At the same time, if the H level BOOT signal is inputted to the signal output circuit 35 from the control circuit 31, the transistor Tr3 is turned ON and, accordingly, the transistor Tr4 is turned OFF. In this embodiment, the transistor Tr4 is a switch element, and the BOOT signal is a specific control signal.

Figure 4:
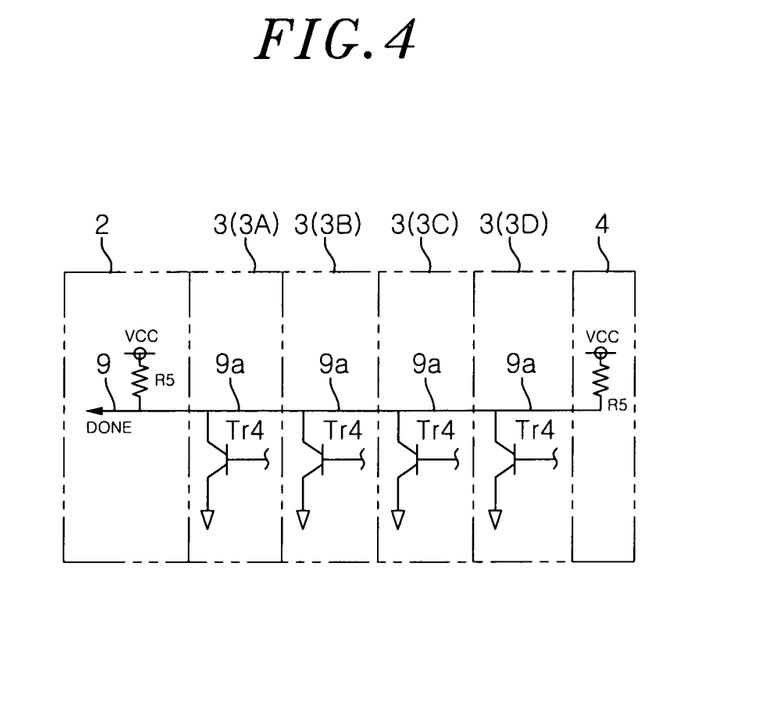
FIG. 4 illustrates a connection example of a signal output circuit of the I/O unit in accordance with the embodiment of the present invention.

FIG. 4 illustrates an example of the signal line 9 connected to the CPU unit 2 and the I/O units 3A to 3D. The respective collectors of transistors Tr4 of the signal output circuits 35 are connected to the signal line 9 in parallel and the signal line 9 is pulled up to the driving power source VCC via a resistor R5. Accordingly, since the entire unit initialization completion signal DONE is set at the L level when one or more of the transistors Tr4 is turned ON, the CPU unit 2 determines that at least one of the I/O units 3 has not been initialized yet. On the contrary, since the entire unit initialization completion signal DONE becomes the H level when all transistors Tr4 are turned OFF, the CPU unit 2 determines that the initialization of all I/O units 3 has been completed.

As shown in FIG. 2A, the I/O unit 3 includes a power line component 10a connected to form the power line 10 and signal line components 7a to 9a connected to form respective signal lines 7 to 9, and so do the neighboring CPU unit 2 and other I/O units 3. Further, the system power source V+ is supplied to the I/O unit 3 via the power line component 10a and the reset signal ERESET is transmitted to the I/O unit 3 from the CPU unit 2 via the signal line component 8a. Further, the entire unit initialization completion signal DONE is inputted to the CPU unit 2 via the signal line component 9a and the entire unit start-up completion signal PSR is also inputted to the CPU unit 2 via the signal line component 7a.

Figure 5:
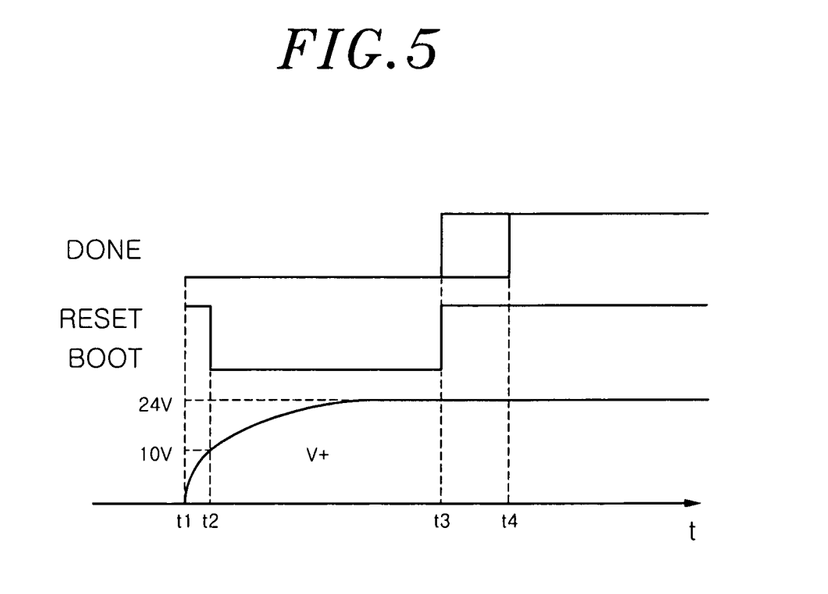
FIG. 5 shows a timing diagram in the initialization of the I/O unit in accordance with the embodiment of the present invention.

FIG. 5 shows timing signals in the initialization of the I/O unit 3. At time point t1, since the system voltage V+ has not been supplied yet when a power switch (not shown) is turned ON, the entire unit initialization completion signal DONE has the L level, and each of the reset signal ERESET and the BOOT signal has the H level. At time point t2, when the system power source V+ reaches 10V, the reset signal ERESET becomes the L level such that the control circuit 31 is reset and makes the BOOT signal set to the L level. Accordingly, since the transistor Tr1 of the signal output circuit 35 is turned OFF and the transistor Tr4 of the signal output circuit 35 becomes an ON state, the entire unit initialization completion signal DONE still has the L level.

Thereafter, at time point t3, when the system power source V+ reaches 24V, the reset signal ERESET becomes the H level such that the control circuit 31 is released from the reset state and sets the BOOT signal to the H level. In a case where there is one I/O unit 3, since the entire unit initialization completion signal DONE becomes the H level, the CPU unit 2 determines that the initialization of all I/O units 3 (in this case, one I/O unit) has been completed.

Meanwhile, in a case where there are two or more I/O units 3, the entire unit initialization completion signal DONE still has the L level at the time point t3. At time point t4, if the initialization completion signal of the H level is outputted from each of the I/O units 3, and the entire unit initialization completion signal DONE becomes the H level, the CPU unit 2 determines that the initialization of all I/O units 3 has been completed.

As shown in FIG. 1, the terminal unit 4 is a unit for short-circuiting between a signal output terminal of the voltage detection circuit 34 of the I/O unit 3D at the end and the signal line component 7a. Accordingly, the start-up completion signal PSO (entire unit start-up completion signal PSR) outputted from the I/O unit 3D at the end is inputted to the CPU unit 2 via the signal line 7. Further, when the start-up completion signal PSO is inputted to the CPU unit 2, the CPU unit 2 determines that all I/O units 3 are powered.

In this embodiment, the programmable controller includes the capacitor C1 as described above (see FIG. 3). Therefore, when the power supply is interrupted due to, e.g., a power failure, the termination process (e.g., data back-up or the like) of the CPU unit 2 is performed by electric power supplied from the capacitor C1. However, since the capacitor C1 has a limited capacitance, if there are many I/O units 3, the electric power from the capacitor C1 may be insufficient to complete the termination process.

In this embodiment, in order to provide the CPU unit 2 with more electric power to complete the termination process, when the output voltage from the capacitor C1 is equal to or lower than the predetermined reference voltage V1 (see FIG. 6), the start-up completion signal PSO is set at the L level to stop the power circuit 33 of each I/O unit 3.

Next, an operation of the programmable controller will be described with reference to a timing diagram shown in FIG. 6. When the system power source V+ supplied from the power unit 1 reaches the reference voltage V1 at time point t1, in the CPU unit 2, the start-up signal PF1 (see FIG. 3) is outputted from the voltage detection circuit 24 to the reset combination circuit 22, and the reset combination circuit 22 outputs the reset signal CPU_RESET of the H level to the control circuit 21.

Further, the reset combination circuit 22 outputs the start-up completion signal CPU_PSO of the H level to the neighboring I/O unit 3A at time point t2 by using a delay timer embedded therein. In the I/O unit 3A, if the start-up completion signal CPU_PSO is inputted to the start-up trigger circuit 32, the power circuit 33 is started. Further, at time point t3, if the output voltage UNIT1_VCC of the power circuit 33 reaches the reference voltage V3, the start-up completion signal UNIT1_PSO of the H level is outputted from the voltage detection circuit 34 to the neighboring I/O unit 3B.

Similarly, the start-up completion signals UNIT2_PSO and UNIT3_PSO of the H level are transmitted to the I/O units 3C and 3D sequentially. At time point t6, if the output voltage UNIT4_VCC from the power circuit 33 of the I/O unit 3D at the end reaches the reference voltage V3, the start-up completion signal UNIT4_PSO of the H level is outputted from the voltage detection circuit 34. Further, the start-up completion signal UNIT4_PSO is inputted to the reset combination circuit 22 of the CPU unit 2 through the signal line 7 via the terminal unit 4. Accordingly, the CPU unit 2 determines that all I/O units 3 are powered at this time point.

Then, the reset combination circuit 22 of the CPU unit 2 outputs the reset signal ERESET of the H level to the signal line 8 at time point t7 by using the delay timer. Each I/O unit 3 cancels a reset state of the control circuit 31 when the reset signal ERESET of the H level is inputted. Accordingly, in the I/O units 3A to 3D in each of which the reset state has been canceled, the initialization of the control circuit 31 is performed.

At time point t8, if the initialization of the control circuits 31 of all I/O units 3A to 3D has been completed, the entire unit initialization completion signal DONE of the H level is inputted to the CPU unit 2 and thereby the CPU unit 2 determines that all I/O units 3 have been initialized. Further, the CPU unit 2 identifies each of the I/O units 3A to 3D and starts communications with each of the I/O units 3A to 3D to perform a sequence program.

Next, an operation in case where the power supply from the external power source stops due to, e.g., a power failure or the like will be described with reference to the timing diagram shown in FIG. 6. As described above, in the power failure, the system power source V+ is supplied to the CPU unit 2 and the I/O units 3 by discharging the capacitor C1 of the power unit 1.

However, at time point t9, if an output voltage of the system power source V+ is equal to or lower than the reference voltage V1, the voltage detection circuit 24 outputs the start-up signal PF1 (voltage reduction signal) of the L level to the reset combination circuit 22 in the CPU unit 2. Then, the reset combination circuit 22 outputs the reset signal ERESET of the L level to each I/O unit 3, thereby resetting the control circuit 31 of each I/O unit 3.

As the above, in this embodiment, each I/O unit 3 can be in advance informed of the turn-off of the power source by the reset signal ERESET of the L level. Accordingly, the termination process (e.g., data back-up) can be performed before the power source is actually cut OFF. That is, the reset signal ERESET of the L level serves as a power failure warning signal.

Further, the reset combination circuit 22 outputs the start-up completion signal PSO of the L level (power supply stop signal) to the neighboring I/O unit 3A at time point t10 by using the delay timer. The power circuit 33 of the I/O unit 3A stops in response to the start-up completion signal CPU_PSO of the L level. Further, if the output voltage of the power circuit 33 becomes 0 V, the start-up completion signal UNIT1_PSO outputted from the voltage detection circuit 34 becomes the L level at time point t11 and, as the start-up completion signal UNIT1_PSO of the L level (power supply stop signal), is outputted to the neighboring I/O unit 3B.

Similarly, the start-up completion signals UNIT2_PSO and UNIT3_PSO of the L level are sequentially transmitted to the I/O units 3C and 3D and the respective power circuits 33 in the I/O units 3C and 3D stop in response thereto. At time point t14, the output voltage of the power circuit 33 of the I/O unit 3D becomes 0V and the L level of the start-up completion signal UNIT4_PSO is outputted from the voltage detection circuit 34 of the I/O unit 3D. Then, the entire unit start-up completion signal PSR of the L level is inputted to the CPU unit 2 via the signal line 7 and thereby the CPU unit 2 determines that all I/O units 3 have been turned OFF.

At time point t15, when the output voltage of the capacitor C1 becomes equal to or lower than the reference voltage V2, the voltage detection circuit 25 outputs the stop signal PF2 to the reset combination circuit 22, and the reset combination circuit 22 outputs the reset signal CPU_RESET of the L level to the control circuit 21. As a result, the control circuit 21 is reset by the reset signal CPU_RESET and, then, the system power source V+ and the driving power source VCC become 0 V.

Further, dashed line A in FIG. 6 represents change in the system power source V+ in case where the I/O units 3 are not turned OFF. In accordance with the present embodiment, the termination time of the CPU unit 2 can be delayed by a time period of t15-t14. Consequently, the CPU unit 2 can acquire an extension time for the termination process such as data back-up.

In accordance with the embodiment of the present invention, each I/O unit 3 is individually powered to initialize. Accordingly, the start-up time of the system is determined by the longest initialization time, which is different from a conventional case in which the start-up time accumulatively increases. Therefore, it is possible to prevent the start-up time of the system from being extended. Further, the CPU unit 2 can realize the initialization completion of all I/O units 3 by detecting a change in the state of the signal line 9. Furthermore, since the signal output circuit 35 can be realized by using a simple and inexpensive element such as the transistor Tr4, it is possible to prevent an increase in the cost of the programmable controller.

In accordance with the embodiment of the present invention, when the power supply from the external power source stops, an electric power is supplied from the capacitor (charging element) C1 and, when the output voltage of the capacitor C1 is lowered to a level equal to or lower than the predetermined reference voltage V1, the power circuit 33 of the I/O unit 3 is stopped. As a result, since the power consumption is suppressed, the operation time of the CPU unit 2 can be extended compared to a conventional case, and an extra time can be provided for the termination process such as data back-up in the CPU unit 2. Further, each I/O unit 3 is in advance informed of the power supply stop by the reset signal ERESET of the L level (power failure warning signal). Accordingly, the needed termination process (e.g., data back-up) can be performed before the power source is actually stopped.

Further, in accordance with the embodiment of the present invention, since each I/O unit 3 is started by the start-up completion signal PSO from the neighboring unit (CPU unit 2 or I/O unit 3), it is possible to surely start the I/O units 3 one by one without doing adjustment and prevent the start-up time from being extended in comparison with a conventional case of setting the start-up time.

Further, when a plurality of I/O units 3 are connected to each other, the I/O units 3 are started not at the same time but sequentially from the I/O unit at the side of the CPU unit 2. Accordingly, an amount of the electric current consumed in the start-up does not exceed the capacity of the external power source, so that the system can be normally started. Further, it is possible to inform each I/O unit 3 that the neighboring I/O unit 3 has been started by the start-up completion signal PSO.

Further, the start-up completion signal PSO (entire unit start-up completion signal PSR) is inputted to the CPU unit 2 from the I/O unit 3D at the end. Accordingly, the CPU unit 2 can determine that all I/O units 3 have been started. Further, in case where the driving power source VCC is generated from the power circuit 33 provided in the CPU unit 2 as in this embodiment, the system power source V+ can be commonly supplied to all I/O units 3. Therefore, it is advantageously unnecessary to exchange the external power sources, e.g., even when the I/O units 3 are exchanged due to a specification change or the like or another I/O unit 3 is additionally installed.

Although the stack type programmable controller is described as an example in the embodiment described above, the present invention may be applied to the building block type programmable controller shown in FIG. 7A. Further, although the I/O units 3 are additionally installed in the above-described embodiment, e.g., network units for communications or control units for serial data may be added. Furthermore, although the number of the I/O units 3 is four in the above-described embodiment, the number of the I/O units 3 may be one, two, three, or five or more without being limited thereto. Although the power unit 1 is separately provided in this embodiment, for example, the CPU unit 2 may have a power supply function.

Further, although a next I/O unit 3 is turned OFF if the output voltage of the power circuit 33 becomes 0 V and the L level of the start-up completion signal PSO is outputted from the voltage detection circuit 34 to the next I/O unit 3 in the above-described embodiment, the output voltage of the power circuit 33 is not limited to 0 V. For example, the output voltage of the power circuit 33 may be equal to or lower than a predetermined reference value.

While the invention has been shown and described with respect to the embodiments, it will be understood by those skilled in the art that various changes and modification may be made without departing from the scope of the invention as defined in the following claims.

What is claimed is:

1. A programmable controller comprising:
one or more extension units;
a CPU unit for controlling the extension units, the extension units being sequentially connected to the CPU unit;
a power line for supplying a first electric power from an external power source to the extension units and the CPU unit; and
a charging element for supplying a second electric power to the extension units and the CPU unit via the power line when supply of the first electric power is cut off,
wherein the CPU unit includes:
a first voltage detection circuit for detecting an output voltage of the charging element and outputting a voltage reduction signal when the detected output voltage is lowered to a level equal to or lower than a first reference value; and
a signal output circuit for outputting a first power supply stop signal in response to the voltage reduction signal outputted from the first voltage detection circuit, and
wherein each of the extension units includes:
a power circuit for generating an internal electric power from the first or the second electric power supplied via the power line;
a second voltage detection circuit for detecting an output voltage of the power circuit and outputting a second power supply stop signal when the detected output voltage of the power circuit is lowered to a level equal to or lower than a second reference value; and
a power supply stop circuit for stopping the power circuit if the first or second power supply stop signal is inputted from the signal output circuit of the CPU unit or the second voltage detection circuit of another extension unit.

2. The programmable controller of claim 1, wherein each of the extension units further includes signal line components connected to form signal lines extending from the CPU unit; and, when the voltage reduction signal is inputted from the first voltage detection circuit, the signal output circuit outputs a power failure warning signal notifying power supply stop to each of the extension units via one of the signal lines before the first power supply stop signal is outputted.

* * * * *